United States Patent [19]
Matzner et al.

[11] 3,755,266
[45] Aug. 28, 1973

[54] LACTAM POLYMERIZATION WITH AMIDE INITIATORS

[75] Inventors: Markus Matzner, Edison; Walter T. Reichle, Millington; Sui-Wu Chow; James E. McGrath, both of Sommerville, all of N.J.

[73] Assignee: Union Carbide Corporation, New York, N.Y.

[22] Filed: Nov. 11, 1971

[21] Appl. No.: 197,933

Related U.S. Application Data

[60] Division of Ser. No. 183,700, Sept. 24, 1971, which is a continuation-in-part of Ser. No. 26,128, April 6, 1970, abandoned.

[52] U.S. Cl............................ 260/78 L, 260/78 P
[51] Int. Cl............................................ C08g 20/18
[58] Field of Search............ 260/78 L, 78 P, 26, 260/128

[56] References Cited
UNITED STATES PATENTS
3,621,001  11/1971  Steinhofer et al................ 260/78 L

FOREIGN PATENTS OR APPLICATIONS
1,081,261  8/1967  Great Britain.................... 260/78 L

OTHER PUBLICATIONS

Mottus, E. et al. ACS Polymer Chemistry Div. Preprints, 9(1)pp. 390–397 (1968)

*Primary Examiner*—William H. Short
*Assistant Examiner*—L. M. Phynes
*Attorney*—Paul A. Rose, James J. O'Connell et al.

[57] ABSTRACT

Certain amide compounds based on aromatic amines are utilized as polymerization initiators or activators with alkaline catalysts in the anionic polymerization of lactam monomers so as to provide polymerization systems which may be utilized in a variety of molding operations.

8 Claims, No Drawings

LACTAM POLYMERIZATION WITH AMIDE INITIATORS

This application is a division of patent application Ser. No. 183,700, filed Sept. 24th, 1971, which is a continuation-in-part of patent application Ser. No. 26,128 filed Apr. 6, 1970, said application Ser. No. 26,128 being now abandoned.

BACKGROUND OF THE INVENTION

1. Field of the Invention

The invention relates to the anionic polymerization of lactam monomers.

2. Description of the Prior Art

In the anionic polymerization of lactams there is usually employed a catalyst-initiator system. The catalyst is commonly a material which will form an alkali or alkaline earth metal salt of the lactam. The initiators or activators that have been used to data have included a number of materials such as lactones, isocyanate compounds, acyl lactones, esters and carbonates. Many of these initiators, such as diisocyanates, are relatively toxic compounds.

Many of the catalyst-initiator systems also suffer from the disadvantage in that each class of such initiators only provides for either a relatively fast or a relatively slow rate of polymerization. As a result, each of these classes of initiators is only suitable for use in one or two, but seldom for very many, different types of molding systems. Thus, although the relatively slow acting polymerization systems are readily useable in rotational casting operations, they are not too readily useful in extrusion molding processes or in other types of casting operations. The fast acting initiators, on the other hand, although useful in extrusion processes and in some casting operations, are not readily useful in rotational casting operations. As a result, it is necessary, in many cases, to use a different catalyst-initiator system in different molding processes.

SUMMARY OF THE INVENTION

Lactams are anionically polymerized utilizing a catalyst-initiator system wherewith the lactams can be polymerized with the one catalyst-initiator system in a variety of types of molding processes. This system contains an anionic catalyst, and, as the initiator or activator, one or more of certain amide compounds which have structures based on aromatic amines.

An object of the present invention is to provide an anionic polymerization process whereby lactams may be readily polymerized with a single catalyst-initiator system in a variety of molding operations.

Another object of the present invention is to provide a novel initiator or activator system for use in the anionic polymerization of lactam monomers.

DESCRIPTION OF THE PREFERRED EMBODIMENT

It has now been found that lactams may be polymerized anionically with a catalyst-initiator system that may be employed in a variety of molding operations if there is employed as such catalyst-initiator system an anionic catalyst and, as an initiator or activator, one or more of certain aromatic amine based amide compounds.

THE LACTAMS

The lactams which may be polymerized according to the present invention are all those which are capable of being polymerized anionically and are preferably those lactam monomers which contain at least one ring group of the structure

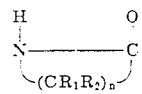

wherein $n$ is a whole number which is 3 to 15, and preferably 3 to 10, and $R_1$ and $R_2$ may be the same or different radicals on each carbon atom and may be H or $C_1$ to $C_{10}$ hydrocarbon.

Such lactams would include those having a single ring structure such as 2-pyrrolidone, 2-piperidone, 6-methyl-2-piperidone, ε-caprolactam, enantholactam, capryllactam, lauryl-lactam, decanolactam, undecanolactam, dodecanolactam, pentadecanolactam, hexadecanolactam, alkyl substituted caprolactams, aryl substituted lactams, and the like.

Lactams having a plurality of ring structures which may be used in the present invention include bislactams such as alkylene bis lactams of the formula:

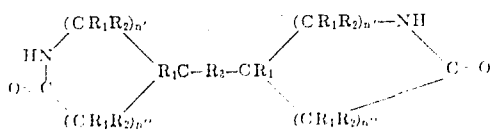

wherein $n'$ and $n''$ are each whole numbers such that $n'$ and $n''$ is 2 to 14; $R_1$ and $R_2$ are as defined above; and $R_3$ may be $C_1$ to $C_4$ alkylene such as methylene, ethylene, propylene and butylene; phenylene and substituted phenylene; O and S.

Other lactams having a plurality of ring structures include bicyclic lactams, such as those represented by the formulae:

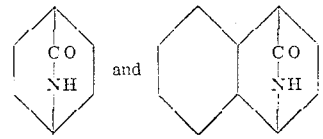

The lactams to be polymerized can be used individually or in any combination thereof.

THE INITIATOR

The initiator which is to be employed in the present invention is a compound having the structure

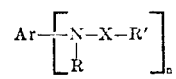

wherein AR is an aromatic radical containing 1 to about 10, inclusive, homocyclic rings, wherein at least one ring in each radical is substituted by at least one electron withdrawing group, and is preferably so substituted in the ortho- or para position relative to the position at which the nitrogen atom is bonded to the Ar radical, and wherein, when Ar contains more than one homocyclic ring, such rings may be fused together or not, and

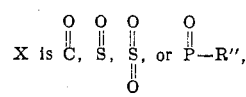

$n$ is a whole number of about 1 to 10 inclusive, R is a $C_1$ to $C_{20}$, inclusive, saturated or unsaturated, substituted or unsubstituted, carbon containing radical which may be a) a hydrocarbon radical including aliphatic, alicyclic and aromatic radicals such as methyl, ethyl, propyl, butyl, cycloheptyl, cyclohexyl, allyl, porpenyl, hexadienyl, octadienyl, phenyl, benzyl and naphthyl, and/or b) a radical containing O, S, and/or N in the carbon chain such as 2-pyridyl, 3-quinolyl, and 2-oxazolyl; and R' and R'' may be the same or different and may be H or R, and where R, R' and R'' are substituted carbon containing radicals, they may contain substituents which are inert to the other components of the polymerization reaction system, such as halogen, i.e., Cl, Br, F, and I, NO and CN. R and R' may also be bonded together to form a cyclic structure with N and X, and in such case R + R' may be [CR$_1$R$_2$]n' wherein R$_1$ and R$_2$ may be the same or different and may be as defined for R' and R'' above, and n' is a whole number which is 3 to about 20 inclusive.

The electron withdrawing groups with which the Ar radical may be substituted include halogen (i.e., Cl, Br, F and I) radicals, CN, CF$_3$, SO$_2$R''', COR''', NO, CCl$_3$, PO(R''')$_2$ and SOR''', wherein R''' is as defined for R' and R'' above. In the PO(R''')$_2$ group only one R''' may be H.

In some of the initiators as noted above, the Ar radical may contain two or more homocyclic rings which are not fused together. In such initiators the non-fused rings may be joined together by a covalent bond, or by one or more linking groups which may be $$\overset{O}{\underset{O}{\overset{\|}{S}}}, \ \overset{O}{\overset{\|}{C}}, \ \overset{O}{\overset{\|}{S}}, \ CF_2, \ CCl_2, \ C(CN)_2, \text{ or } \overset{O}{\overset{\|}{P}}-R''',$$

wherein R''' is as defined above

The groups which are used to link two or more rings together may also be considered as being electron withdrawing groups with which the Ar radical is to be substituted.

Where n is 1, the initiators are monoamides and where n is >1, the initiators are polyamides. Examples of the substituted Ar radicals in the monoamides would thus include

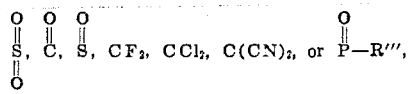

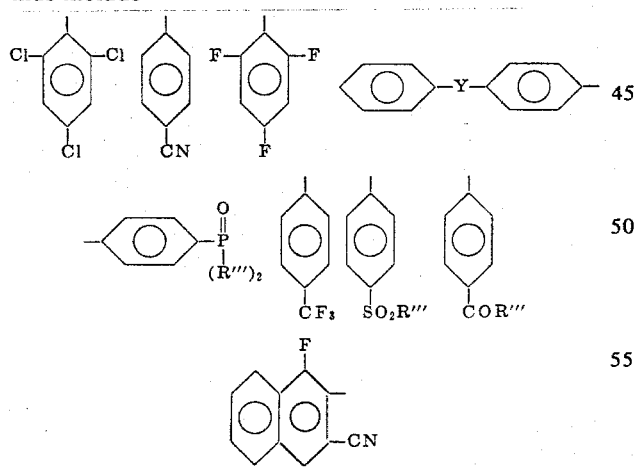

wherein R''' is as defined above.

Examples of the substituted Ar radicals in the polyamides would include

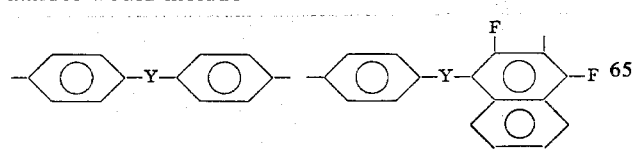

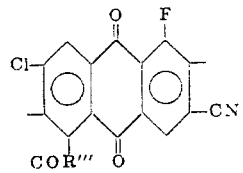
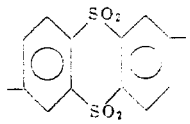

wherein R''' is as defined above, and

Y = SO, SO$_2$, CO, CF$_2$, CCl$_2$, C(CN)$_2$ or POR''' wherein R''' is as defined above.

The initiators of the present invention may be used individually, or in combination with one or more of each other, or with other initiators. About 0.2 to 10, and preferably 0.5 to 5, mole per cent of initiator is employed based on the moles of lactam being polymerized.

THE POLYMERS

The use of the initiators of the present invention results in the preparation of polymers by the following two step procedure, in which the use of a monoamide initiator is shown:

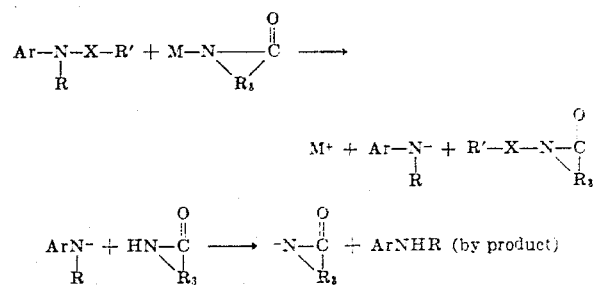

This step ↑ regenerates the anion and then

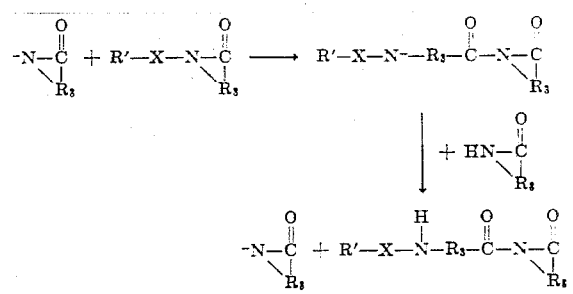

anion again regenerated.

The last two steps are repeated many times and result in a polymer having the structure

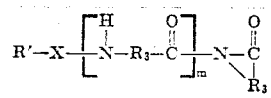

wherein
Ar, X, R and R' are as defined above,
M is the cation of the anionic catalyst, and $R_3$ is that portion of the structure of the lactam being polymerized which lies between the nitrogen atom and the carbonyl carbon atom of such lactam, and $m$ is a whole number which is $>1$ and is such that the polymer is a material, that is normally solid, i.e., solid at temperatures of about 25° C., and has a reduced viscosity in $m$-cresol (0.1 gram/100 ml) at 25° C. of $\geq 0.4$, and preferably about 0.8 to 7, deciliters/grams.

The value of $m$ may vary somewhat in each polymerized lactam chain, and will be about 10 to about 5,000. The polymers would thus have molecular weights of about 1,000 to 500,000 or more.

The lactam polymers prepared with the amide initiators of the present invention have good physical properties.

THE CATALYST

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organometallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triisopropyl aluminum, diisobutyl hydride, and lithium aluminum hydride.

About 0.2 to 20, and preferably 0.5 to 6 mole per cent of catalyst is used per mole of monomer being polymerized.

The catalyst and initiator are employed in a mole ratio to each other of about 2 to 20, and preferably, 3 to 12.

When the strong base is reached with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

THE POLYMERIZATION PROCESS

The polymerization reaction is preferably conducted in bulk. Under such bulk polymerization procedures the monomer, catalyst and initiator are charged in the desired proportions to the reactor. The bulk polymerization reaction is usually conducted at atmospheric pressure and at a temperature of about 100° to 250° C. The reaction can be conducted at a temperature which is above or below the melting point of the resulting polymer, and above that of the monomer. The use of elevated pressure is not required for the polymerization reaction. The bulk polymerization reaction requires a polymerization period of about 3 to 15 minutes at 100°–250° C, depending on the lactam(s) employed, and the polymerization temperature. The bulk polymerization reaction should be carried out under anhydrous conditions, i.e., in the presence of no more than about 0.3 weight per cent, and preferably no more than 0.03 weight per cent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the polymer and the molded objects can be formed in one step. Where the polymerization is conducted in such molding devices, conventional molding pressures may be employed in order to simultaneously form the molded object with the in situ formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of above 100° C., such as chlorobenzene, dichlorobenzene, xylene, trichlorobenzene, dimethyl sulfoxide, N-alkyl pyrrolidones and hexamethylphosphoramide at temperatures of about 100° C. up to the boiling point of the solvent; or at temperatures of about 130° to 240° C. in dispersion systems such as those disclosed in U.S. Pat. Nos. 3,061,592 and 3,383,352, and by G.B. Gechele and G.F. Martins in J. Applied Polymer Science 9, 2939 (1965).

ADJUVANTS

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular polymer being prepared as well as the end use application will dictate the selection and quantity of the adjuvant to be employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for intended purpose. Thus, a stabilizer would be used in a stabilizing effective quantity, and the fillers would be used in effective quantities therefor. For example, if a reinforcing filler were to be used, such filler should be used in such amounts as to provide the desired reinforcing effect.

The polymers made by the process of the present invention may be used for a number of applications which require the use of molded articles prepared from lactam polymers such as fibers, films, engineering structures, coatings and hollow articles such as tubing and solvent tanks.

The following examples are merely illustrative of the present invention and are not intended as a limitation upon the scope thereof.

EXAMPLE 1

Preparation of N,N'-dimethyl-N,N'-diacetyl-4,4'-diaminodiphenyl sulfone, i.e.,

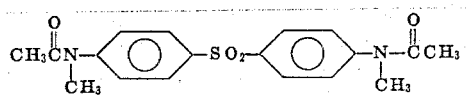

500 grams (1.74 mole) of 4,4'-dichlorodiphenylsulfone, 5.0 grams of cuprous chloride and 1,200 ml of 40 percent aqueous methylamine (14.2 mole) were heated in a 2.2 liter titanium-lined bomb for 18 hours at 250°C. After cooling, the slurry was filtered, the solids washed twice with cold water and dried (75°/vacuum); yield 472 g.; 98 percent of theory. The product melted at 163°-173° C. Crystallization of a small sample from ethanol yielded the N,N'-dimethylamine compound with a M.P. of 175°-177° C.

50 grams of the diamine were refluxed overnight in 50 ml. of glacial acetic acid and 50 ml. acetic anhydride. The solvent was then evaporated and the desired diamide product was crystallized from 500 ml of 80 percent aqueous ethanol; m.p. 155°-7° C.

EXAMPLE 2

Preparation of N,N'-dimethyl-N,N'-trifluoroacetyl-4,4'-diaminodiphenyl sulfone, i.e.,

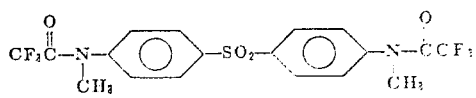

10 grams of the N,N'-dimethylamine compound prepared as in Example 1 were refluxed in 35 ml. of trifluoroacetic acid and 15 ml. of the anhydride of trifluoroacetic acid. The desired trifluoroacetyl derivative thus produced was crystallized from ethanol, melting point: 160.0°-161.5° C.

EXAMPLE 3

Preparation of N-methyl-2,4,6-trichloroacetanilide, i.e.,

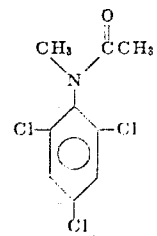

28.6 grams (0.27 mole) of N-methylaniline were chlorinated at 10°-18° in 114 ml. of acetic acid with 60 grams (0.84 mole) of $Cl_2$. Following this, 56 grams of acetic anhydride (0.55 mole) were added and the liquid system was refluxed over night. The volatiles were removed and the residue charcoaled and crystallized from 25 percent aqueous ethanol, to provide 8.3 grams of the desired compound which had a melting point (M.P.) of 85°-7° C.

EXAMPLE 4

Anionic polymerization of ε-Caprolactam using N,N'-dimethyl, N,N'-trifluoroacetyl, 4,4'-diaminodiphenyl sulfone as the initiator Molten ε-caprolactam (28.3 grams, 0.25 mole) was added to two cylindrical 25 mm × 200 mm glass tubes (total monomer charge was 56.6 grams or 0.5 mole). Both tubes were heated in a 160° C. oil bath. Sodium hydride (0.48 grams, $2 \times 10^{-2}$ mole, as 0.84 grams of a 57 percent mineral oil dispersion, 4 mole percent based on the total monomer) was added to one tube. It quickly reacted to form a homogeneous solution of sodium ε-caprolactam in ε-caprolactam.

Initiator (1.0 grams, $2.14 \times 10^{-3}$ mole, 0.42 mole percent based on the total monomer) was added to the second test tube. After a solution was formed in this test tube and the temperature of the two solutions were equilibrated at the bath temperature, the two solutions were mixed and heated in the bath. The progress of the polymerization was followed visually. The polymer viscosity was higher after 7 minutes. Crystallization started at 18 minutes. The polymer was removed from the bath after 10 minutes. The properties of the polymer were as follows: reduced viscosity 1.29 dl/gm., % methanol extractables 2.86, tensile modulus 308,000 psi, tensile strength 10,000 psi, elongation at break 30 percent and pendulum impact 253 ft. lb./in³.

EXAMPLES 5-9

Anionic polymerization of ε-caprolactam using N,N'-dimethyl-N,N'-diacetyl-4,4'-diaminodiphenyl sulfone as the initiator.

A series of five polymerization reactions were conducted. In each of the five examples each of two 25 × 200 mm test tubes were charged with 28.3 grams (0.25 mole) of molten ε-caprolactam and both test tubes were then heated at the desired polymerization temperature. Sodium hydride in the form of a 57 percent dispersion in oil was added to one of these test tubes while the initiator was added to the other. After solutions were formed and equilibrated with the bath temperature they were mixed, and then heated at the desired polymerization temperature. The progress of the polymerization was followed visually. The polymer that formed was ground up and extracted with methanol in a Soxhlet extractor for 25 hours to determine the per cent of extractables (monomer and oligomers). The amounts of catalyst and initiator used and the polymerization conditions and results are summarized below in Table I for each of the five examples.

TABLE I

| Example | NaH mole, percent | Initiator mole, percent | Polym. temp., °C | t(min.) cryst. | t(min.) heating discontinued | Percent extractable | HDT, °C | RV., dl./gm. |
|---|---|---|---|---|---|---|---|---|
| 5 | 2 | 0.5 | 160 | 2 | 4 | 6.0 | 71.2 | 1.8 |
| 6 | 2 | 0.75 | 160 | 1.5 | 4 | 7.1 | | 1.8 |
| 7 | 2 | 0.5 | 140 | 3 | 5 | 5.9 | 80.8 | 1.3 |
| 8 | 2 | 0.75 | 140 | 2.5 | 5 | 7.2 | | 1.4 |
| 9¹ | 4 | 0.56 | 165 | 1 | 5 | 11.4 | | 1.52 |

¹ A film of the extracted polymer was compression molded at 250° C. and it had tensile modulus 297,000 p.s.i., tensile strength 9,700, elongation at break 70% and pendulum impact 159.

Note.—HDT = heat distortion temperature.

EXAMPLES 10-12

N-methyl-2,4,6-trichloroacetanilide as initiator for the polymerization of ε-Caprolactam A series of three polymerization reactions were conducted. In each of the three examples the general polymerization procedure used is the same as that described in Examples 5-9, except that N-Methyl-2,4,6-Trichloroacetanilide was used as the initiator. The amounts of the catalyst and initiator that were used and polymerization conditions and results are summarized below in Table II for each of the three examples.

TABLE II

| Expt. No. | NaH mole, percent | Initiator mole, percent | Polym. temp., °C | t(min.) cryst. | t(min.) heating discontinued | Percent extractables | HDT, °C | RV., dl./gm. |
|---|---|---|---|---|---|---|---|---|
| 10 | 2 | 0.5 | 162 | 12.5 | 21 | 13.3 | 83 | 3.1 |
| 11 | 4 | 1.0 | 162 | 5.0 | 18 | 8.6 | | 2.1 |
| 12 | 4 | 1.6 | 165 | 5.5 | 19 | 8.0 | | 1.7 |

EXAMPLE 13

Preparation of N,N'-dibenzoyl-N,N'-dimethyl-4,4'-diamino diphenyl sulfone, i.e.,

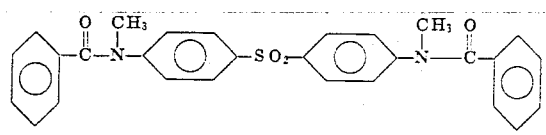

A solution of 56 g. (0.4 mole) of benzoyl chloride in 50 ml. of pyridine was added slowly to a solution of 27.6 g. (0.1 mole) of bis-(N-methyl-p-aminophenyl)sulfone in 80 ml. of pyridine. A mild exotherm was noted. When the exotherm ceased, the reaction solution was heated under reflux for 24 hours. The solution was poured into water and the bis-benzamide was separated from the water by extraction with chloroform. The chloroform solution was evaporated, and the residue was recrystallized successively from chloroform-carbon tetrachloride (1:2) and 20 percent aqueous ethanol. There was obtained 27 g. of the bis-benzamide, m.p. 125°–128°, nmr spectrum exhibited chemical shifts (TMS, in CDCl₃) at 7.71, 7.20, 7.15 for aromatic protons and 3.45 ppm for N-CH group, with total aromatic proton to N-CH₃ area ratio of 2.94 to 1 (theory 3 to 1). Elemental Analysis values for $C_{28}H_{24}N_2O_4S$:
Calculated: S- 6.62; N-5.78
Found: S- 6.49; N-5.77

EXAMPLE 14

Polymerization of ε-caprolactam using the diamide compound prepared as in Example 13 as an anionic polymerization initiator.

Into each of two 25 × 200 mm test tubes was added 28.3 g. (0.25 mole) of molten caprolactam and both were then heated at a polymerization temperature of 160° C. Two (2) mole percent of a catalyst, sodium hydride, in the form of a dispersion (57 percent) in oil was added to one of these test tubes, while 1.0 mol percent of the initiator was added to the other. After solutions were formed and equilibrated with the bath temperature, they were mixed and then heated at the 160° C. polymerization temperature. The progress of the polymerization was followed visually. The time required for the development of opacity was taken as the time required for crystallization of the nylon-6 formed.

The no-flow time for the polymerization system was one minute and the time required for crystallization was 1.5 minutes.

EXAMPLE 15

Preparation of p-phenyl sulfonyl-N-methyl acetanilide, i.e.,

A mixture of 25 g. (0.1 mole) of phenyl p-chlorphenyl sulfone, 75 ml. of 40 percent aqueous methylamine, and 0.25 g. of cuprous chloride was heated at 250° in a rocker bomb for 24 hours. The resulting aminated sulfone was isolated by washing with water until methylamine odor was only faintly detectable. To the crude aminated sulfone there was added 100 ml. of acetic anhydride and the mixture was heated at reflux for 24 hours.

Excess acetic anhydride was then evaporated from the reaction system and the residue was poured into water. The amide was collected and recrystallized from 20 percent aqueous ethanol. There was obtained 17.8 g. of the desired amide which had a melting point of 130° – 132°.

EXAMPLE 16

Polymerization of ε-caprolactam using the amide compound prepared as in Example 15 as an anionic polymerization initiator.

Into each of two 25 × 200 mm test tubes was added 28.3 g. (0.25 mole) of molten caprolactam, and both were then heated at a polymerization temperature of 160° C. Two (2) mole percent of a catalyst, sodium hydride, in the form of a dispersion (57 percent) in oil was added to one of these test tubes, while 0.5 mole percent of the initiator was added to the other. After solutions were formed and equilibrated with the bath temperature, they were mixed and then heated at the 160° C. polymerization temperature. The progress of the polymerization was followed visually. The time required for the development of opacity was taken as the time required for crystallization of the Nylon 6 formed.

The no flow time for the polymerization system was 1 to 1.5 minutes, and the time required for crystallization was 1.5–2 minutes.

EXAMPLE 17

Preparation of N,N'-dimethylsulfonyl-N,N'-dimethyl-4,4'-diamino diphenyl sulfone, i.e.,

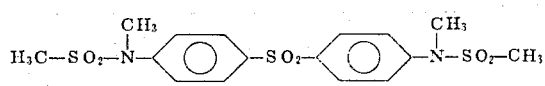

A solution of 33 g. (0.4 mole) of methanssulfonyl chloride in 50 ml. of pyridine was added dropwise to a solution of 27.6 grams (0.1 mole) of bis-(N-methyl-p-aminophenyl)sulfone in 100 ml of pyridine over a period of about 15 minutes. After the mild exotherm subsided, the mixture was heated at reflux for 22 hours. The reaction mixture was poured into water and the precipitated product was washed with water and recrystallized from chloroform. There was added 24.5 g. of the desired sulfonamide which had a melting point of 213°–215° C.

Anal: Calc. for $C_{16}H_{20}N_2O_6S_3$: C, 44.43; H, 4.60; N, 6.48; S, 22.23

Found: C, 43.92; H, 4.37; N, 6.34; S, 22.38

EXAMPLE 18

Polymerization of ε-caprolactam using the diamide compound prepared as in Example 17 as an anionic polymerization initiator.

Into each of two 25 × 200 mm test tubes was added 28.3 g. (0.25 mole) of molten caprolactam, and both were then heated at a polymerization temperature of 160° C. Two (2) mole percent of a catalyst, sodium hydride, in the form of a dispersion (57 percent) in oil was added to one of these test tubes, while 1.0 mole percent of the initiator was added to the other. After solutions were formed and equilibrated with the bath temperature they were mixed and then heated at the 160° C. polymerization temperature. The progress of the polymerization was followed visually. The time required for the development of opacity was taken as the time required for crystallization of the Nylon 6 formed.

The crystallization time for the polymerization system was 53 minutes.

EXAMPLE 19

A. Preparation of (N-methyl-p-aminophenyl)diphenyl phosphine oxide, i.e.,

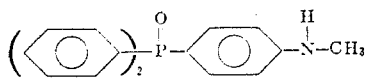

Twenty (20.0) grams of (p-chlorophenyl)diphenyl phosphine oxide, i.e.,

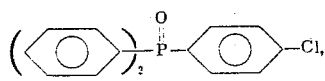

were heated in a 220 ml titanium lined bomb at 250° C. for 18 hours with 120 ml of 40 percent aqueous methylamine, ($CH_3NH_2$). The temperature of the reaction was then quenched to room temperature and the contents of the bomb were transferred to a 500 ml beaker to which 200 ml of water were added. The system was heated at 100° C. for about 1 hour to remove volatile material. The resulting system was then washed several times with water to remove $CH_3NH_2 \cdot HCl$ and the product was dried. There was obtained 18.3 grams of the product (93 percent of theory). A 5 gram sample of the product was then crystallized twice from 50/50 benzene/cyclohexane to yield 4.1 grams of (N-methyl-p-aminophenyl)diphenyl phosphine oxide. This product had a melting point of 177°–178° C. Analysis for $C_{19}H_{18}PON$:

Calculated: C, 74.27; H, 5.86; N, 4.56
Found: C, 75.34; H, 6.00; N, 4.15

The infrared spectrum of the compound showed

N—H, $$\overset{O}{\underset{P}{\|}}$$

monosubstituted phenyl and para-disubstituted phenyl absorption bands. The nmr analysis of the compound showed aryl-H/$CH_3$-H in the ratio of 4.65 (theory 4.68).

B. Preparation of (N-acetyl-N methyl-p-aminophenyl) diphenyl phosphine oxide, i.e.,

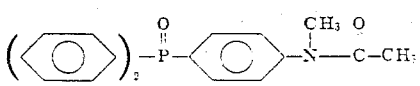

13.3 grams of the (N-methyl-p-aminphenyl)diphenyl phosphine oxide prepared above in Example 19A and 4.42 grams of acetic acid anhydride were admixed in 100 ml of glacial acetic acid and then refluxed for 45 minutes. The volatile components of the system were then evaporated at 100° C. The residual acetic acid was displaced with toluene twice, at 50° C (25–50 mm Hg). The yield (crude) of the desired product was 12.5 grams or 83 percent of theoretical. When crystallized from 50/50 benzene/cyclohexane and then from 50/50 benzene/ethyl ether, the product had a melting point of 148°–149° C. Analysis for $C_{21}H_{20}O_2PN$
Calculated: C, 72.21; H, 5.73; N, 4.01
Found: C, 72.15; H, 5.42; N, 4.13

The infrared spectrum of the compound had intense

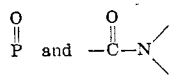

absorptions, next to the monosubstituted phenyl and paradisubstituted phenyl absorption bands. The nmr analysis of the compound showed aryl-H :

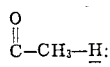

: N-CH₃-H ratios of 4.95 : 1 : 1 (theory 4.68 : 1 : 1).

EXAMPLES 20–22

Polymerization of ε-caprolactam using the amide compound prepared in Example 19B as an anionic polymerization initiator.

A series of three polymerization reactions were conducted. In each of the three examples each of two 25 × 200 mm test tubes were charged with 28.3 grams (0.25 mol) of molten ε-caprolactam and both test tubes were then heated to a temperature of 150° C. Sodium hydride in the form of a 57 percent dispersion in oil was then added to one of these test tubes while the initiator was added to the other. After solutions were formed in each of the test tubes and equilibrated with the 150° C. bath temperature, the contents of the two test tubes were mixed, and heated in the 150° C. bath. The progress of the polymerization was followed visually. The time required for the development of opacity was taken as the time required for crystallization of the nylon-6 polymer that was formed. The amounts of catalyst and initiator that were used (mole % and the crystallization time required in each experiment are summarized below in Table III for each of the three examples.

TABLE III

| Example | NaH mole% | initiator mole% | Crystal. time (minutes) |
|---|---|---|---|
| 20 | 2 | 1 | 5–6 |
| 21 | 4 | 2 | 3–4 |
| 22 | 4 | 2 | 4–5 |

EXAMPLE 23

Preparation of N,N'-formyl-N,N'-methyl-4,4'-diamino diphenyl sulfone, i.e.,

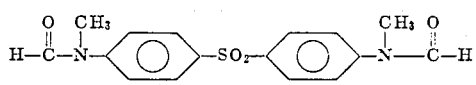

Bis(N-methyl-p-aminophenyl)sulfone (27.6 grams, 0.01 mole) was heated at reflux in 100 grams of formic acid (90 percent) for 24 hours. The reaction mixture was then evaporated to dryness under reduced pressure at 80°–100° C. The crude product was then washed with water and recrystallized from 50—50 chloroform/hexane. There was obtained 19 grams of bis(N-formal-N-methyl-p-aminophenyl) sulfone which had a melting point of 210°–212° C.

EXAMPLE 24

Polymerization of ε-caprolactam using the compound prepared as in Example 23 as an anionic polymerization initiator.

Into each of two 25 × 200 mm test tubes was added 28.3 grams (0.25 mol) of molten ε-caprolactam and both were then heated at a temperature of 150° C. Two (2) mole percent of a catalyst, sodium hydride, in the form of a dispersion (57 percent) in oil was added to one of these test tubes, while 0.5 mole percent of the initiator was added to the other. After solutions were formed in each of the test tubes and equilibrated with the 150° C. bath temperature, they were mixed and then heated at 150° C. The progress of the polymerization was followed visually. The time required for the development of opacity was taken as the time required for crystallization of the nylon-6 that was formed. The time required for crystallization was 15–17 minutes.

EXAMPLE 25

Preparation of N,N'-diphenylphosphoryl-N,N'-dimethyl-4,4'-diamino diphenyl sulfone, i.e.,

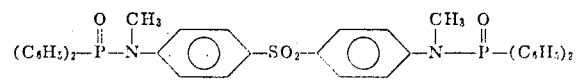

A solution of 9 grams (3.8 millimols) of diphenylphosphoryl chloride and 5.25 grams (1.9 millimols) of bis(p-methylaminophenyl) sulfone in 100 ml of pyridine was heated at reflux for 16 hours. The reaction mixture was then evaporated to dryness under aspirator pressure. The resulting residue was then extracted with benzene. Upon evaporation of the benzene from the extract there was obtained 9.8 grams (80 percent of theoretical) of N,N'-diphenylphosphoryl-N,N'-dimethyl-4,4'-diamino diphenyl sulfone in crude form which had infrared absorptions at 7.5, 8.6μ (for SO₂); 7.7μ (for PO); and a triplet at 13.25, 13.7 and 14.4μ [for $(C_6H_5)_2P$].

EXAMPLE 26

Polymerization of ε-caprolactam using the compound prepared as in Example 25 as an anionic polymerization initiator.

Into each of two 25 × 200 mm test tubes was added 28.3 grams (0.25 mole) of molten ε-caprolactam and both test tubes were heated to 160° C. Four (4) mole percent of a catalyst, sodium hydride, in the form of a dispersion (57 percent) in oil was added to one of these test tubes, while 1.0 mole percent of the initiator was added to the other. After solutions were formed in each of the test tubes and equilibrated with the 160° C. bath temperature, they were mixed together and then heated at 160° C. The progress of the polymerization was followed visually. The time required for the development of opacity was taken as the time required for crystallization of the nylon-6 polymer that was formed.

The no-flow time for the polymerization system was 3 minutes and the crystallization time was about 30 minutes.

PREPARATION OF THE INITIATORS

The initiators used in the process of the present invention may be prepared as disclosed in some of the above examples and as disclosed in several United States Patent applications, i.e., "Halogenated Diamino Diphenyl Sulfone Derviatives" filed Apr. 6, 1970 as Ser. No. 26,056, now abandoned and refiled Dec. 6,1971 as C-I-P 205,322 in the name of W. T. Reichle, and "Aromatic Acid Diamides of Diamino Diphenyl Sulfones,"

"Monoamides of Monamino Diaryl Sulfones," and

"Disulfonamides of Diamino Diphenyl Sulfones," which latter three applications were filed Apr. 6, 1971 in the names M. Matzner, W.T. Reichle, S.W. Chow and J.E. McGrath as Ser. No. 26,503, now U.S. Pat. No. 3,696,131; 26,057, now U.S. Pat. No. 3,696,132 and 26,045, now U.S. Pat. No. 3,718,672 respectively. The disclosures of all of such applications are incorporated herein by reference.

The initators of the present invention are prepared by reacting an amine compound of the structure

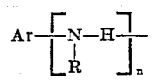

wherein AR, R and $n$ are as defined above, with at least a molar equivalent, and preferably a molar excess, of a compound having the structure $A+X-R']_a$, wherein X an and R' are as defined above, and $a$ is 1 or 2, and when $a$ is 1, A is OH or a halogen radical, i.e., Cl, F, Br or I, and when $a$ is 2, A is an O radical. When A is a halogen radical, halogen acid is formed as a by-product, when A is an OH radical, water is formed as a by-product, and when A is an O radical, an acid is formed as a by-product. When a halogen acid is formed as a by-product the reactions are preferably conducted in a halogen acid accepting solvent such as pyridine, alkyl substituted pyridines and triethylamine. At least one mole of such acid accepting solvent is used per mole of halogen acid formed in the reaction. Excess solvent may be used for diluent purposes.

When water is a by-product, the reaction system preferably contains mechanical or chemical means for effectively removing the water so that the reaction may be driven to completion.

The reaction is conducted at atmospheric pressure and at temperatures of about 80° to 200° C. The preferred temperature is the reflux temperature of the mixture of the components of the reaction system. The reaction may be run under an inert blanket of a moisture free gas such as nitrogen. The reaction is usually conducted for a period up to about 24 hours.

The initiator compounds are crystalline materials which may be readily recovered from the reaction systems in which they are prepared by precipitation with water or by extraction with solvents such as chloroform, benzene and toluene followed by crystallization from appropriate solvents such as chloroform, aqueous ethanol or aqueous acetone, benzene, cyclohexane, ethyl ether and hexane.

The initiators prepared in Examples 1, 2, and 23 are representative of a subclass of initators wherein, $n$, as defined above, is 2, X, as defined above, is

and, R', as defined above is H or a $C_1$ to $C_{20}$, inclusive, hydrocarbon or perhalocarbon radical. The preferred of such R' radicals are aliphatic radicals.

The initiators prepared in Example 15 and 19B is representative of initiators wherein $n$, as defined above, is 1, X, as defined above, is

and R', as defined above, is a $C_1$ to $C_{20}$, inclusive, hydrocarbon radical.

The initiator prepared in Example 17 is representative of initiators wherein $n$, as defined above, is 2, X, as defined above is $SO_2$, and R', as defined above, is a $C_1$ to $C_{20}$, inclusive hydrocarbon radical.

The initiator prepared in Example 13 is representative of initiators wherein $n$, as defined above is 2, X, as defined above, is

and the two R's, as defined above, are the same or different mono-or polynuclear aromatic radicals. These aromatic radicals may be unsubstituted, or substituted with one or more inert substituents. Where these aromatic radicals contain a plurality of phenyl rings, the rings may be fused together, or bonded together through a single covalent bond or through an intervening polyvalent inorganic or organic radical. The preferred of these aromatic radicals are substituted or unsubstituted phenyl and naphthyl radicals.

The initiator prepared in Example 25 is representative of initiators wherein $n$, as defined above, is 2, X, as defined above, is

and R', as defined above, is a $C_1$ to $C_{20}$, inclusive, hydrocarbon radical.

We claim:

1. In an improved process for anionically polymerizing lactam monomer having 4 to 16 annular carbon atoms in each ring structure thereof with anionic lactam polymerization catalyst and anionic lactam polymerization initiator to produce moldable polyamide resin, the improvement wherein said initiator is at least one compound having the structure

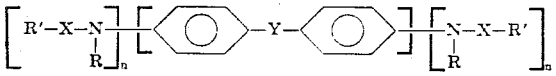

wherein
X is SO or $SO_2$,
Y is SO or $SO_2$,
$n$ is a whole number of 1 to about 5, inclusive, and
R and R' are $C_1$ to about $C_{20}$, inclusive, hydrocarbon radicals.

2. A process as in claim 1 in which Y is $SO_2$.

3. A process as in claim 2 in which X is $SO_2$.

4. A process as in claim 3 in which the two R's are the same.

5. A process as in claim 4 in which R' is $CH_3$.

6. A process as in claim 5 in which said initiator comprises N,N'-dimethylsulfonyl-N,N'-dimethyl-4,4'-diamino diphenyl sulfone.

7. A process as in claim 1 in which said lactam monomer comprises ε-caprolactam.

8. A process as in claim 1 which is conducted in a shaping device with the simultaneous formation of a shaped article.

* * * * *